United States Patent
Suda

(10) Patent No.: US 7,512,328 B2
(45) Date of Patent: Mar. 31, 2009

(54) IMAGE-TAKING APPARATUS AND FOCUSING METHOD

(75) Inventor: Hirofumi Suda, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 382 days.

(21) Appl. No.: 11/532,161

(22) Filed: Sep. 15, 2006

(65) Prior Publication Data

US 2007/0065127 A1  Mar. 22, 2007

(30) Foreign Application Priority Data

Sep. 20, 2005  (JP)  ............... 2005-271423

(51) Int. Cl.
*G03B 17/00* (2006.01)

(52) U.S. Cl. .......... 396/52; 396/104; 396/125; 348/208.12

(58) Field of Classification Search ............ 396/52–55, 396/79–80, 102, 104, 125–128; 348/209.99, 348/208.1–208.2, 208.4–208.12, 208.16, 348/235
See application file for complete search history.

(56) References Cited

U.S. PATENT DOCUMENTS

| | | | | |
|---|---|---|---|---|
| 5,130,735 A * | 7/1992 | Kusaka et al. | ............... | 396/104 |
| 5,231,445 A * | 7/1993 | Onuki et al. | ............... | 396/55 |
| 5,597,999 A * | 1/1997 | Kinba et al. | ............... | 250/201.7 |
| 5,862,415 A * | 1/1999 | Matsumoto | ............... | 396/55 |
| 6,081,668 A * | 6/2000 | Furuyama et al. | ............... | 396/55 |
| 6,226,459 B1 * | 5/2001 | Hamada et al. | ............... | 396/54 |
| 6,763,187 B2 * | 7/2004 | Shiraishi | ............... | 396/104 |
| 7,450,838 B2 * | 11/2008 | Nonaka | ............... | 396/80 |
| 2003/0012568 A1 * | 1/2003 | Ishikawa et al. | ............... | 396/104 |
| 2004/0239771 A1 * | 12/2004 | Habe | ............... | 348/208.12 |
| 2005/0185084 A1 * | 8/2005 | Nonaka et al. | ............... | 348/345 |
| 2006/0055788 A1 * | 3/2006 | Kawabe | ............... | 348/208.12 |

* cited by examiner

*Primary Examiner*—W. B. Perkey
*Assistant Examiner*—Bret Adams
(74) *Attorney, Agent, or Firm*—Cowan, Liebowitz & Latman, P.C.

(57) ABSTRACT

An image-taking apparatus is disclosed which is capable of performing accurate focusing even when a shake occurs. The image-taking apparatus comprises an image-pickup element which photoelectrically converts an optical image formed by an image-taking optical system; a controller which performs a first focusing control based on a phase difference of plural optical images formed of luminous fluxes not passing through the image-taking optical system, which plural optical images are detected by a light receiving sensor that photoelectrically converts the plural optical images, and a second focusing control based on an image signal generated by an output from the image-pickup element; and a shake detector which generates information on a shake. The controller preferentially performs one of the first focusing control and the second focusing control in accordance with the information on the shake.

12 Claims, 9 Drawing Sheets

DISTANCE 1(FAR)

DISTANCE 2 (NEAR)

HORIZONTAL SHAKE

VERTICAL SHAKE

IMAGE-TAKING APPARATUS AND FOCUSING METHOD

BACKGROUND OF THE INVENTION

The present invention relates to image-taking apparatuses, such as video cameras and digital still cameras, which have an autofocus function, and to a focusing method for the image-taking apparatuses.

In so-called autofocus of contrast detection method (hereinafter referred to as contrast AF), high frequency components of an image-pickup signal are extracted, and focusing is obtained by searching a focus lens position at which the high frequency components become maximum. In the contrast AF, focusing can be highly accurately obtained since the focusing control is performed by using an image-pickup signal which is a signal obtained by photoelectrically converting an optical image formed by an image-taking optical system. In particular, the contrast AF is effective for a camera using an image-pickup element with a large number of pixels which requires high focusing accuracy. However, in AF based on this method, the focus lens is moved while an in-focus position is searched. As a result, a relatively long time is needed until an in-focus state is obtained.

On the other hand, in autofocus of a direct distance measuring method using a so-called pupil-dividing phase-difference detection method (hereinafter referred to as external distance measuring AF), a distance to an object is directly measured, so that it is possible to easily specify an in-focus position, and to thereby obtain an in-focus state in a short period of time. However, in this method, the distance measuring is performed through a system different from the image-pickup system, and hence, the focusing accuracy is liable to be deteriorated by a temperature change and the like.

Thus, in recent years, a hybrid AF has been proposed in which high speed and high accuracy autofocus is realized by using the contrast AF in combination with the external distance measuring AF (Japanese Patent Laid-Open No. 2001-264622, Japanese Patent Laid-Open No. 2001-141984, Japanese Patent Laid-Open No. H03-81713).

In Japanese Patent Laid-Open No. 2001-264622, there is proposed a method in which switching from the external distance measuring AF to the contrast AF is performed in accordance with an operation of an image-taking switch. Further, in Japanese Patent Laid-Open No. 2001-264622, there is proposed a method in which a difference between in-focus positions detected by the external distance measuring AF and the contrast AF, respectively, is obtained, and in which when the difference is not less than a predetermined value, one of the external distance measuring AF and the contrast AF is selected in accordance with a predetermined condition.

Further, in Japanese Patent Laid-Open No. 2001-141984, there is proposed a method in which a focus lens is driven to a front focus/rear focus position by a predetermined amount by the external distance measuring AF, and thereafter the switching from the external distance measuring AF to the contrast AF is performed. In this method, when an in-focus state cannot be obtained by the contrast AF after the switching, the focusing mode is again returned to the external distance measuring AF.

Further, in Japanese Patent Laid-Open No. H03-81713, there is proposed a method in which when the focal point is largely deviated and the high frequency components are not contained in the image-pickup signal, determination of the direction of an in-focus position and drive of a focus lens are performed by the external distance measuring AF, and in which after the high frequency components are detected, an in-focus state is obtained by the contrast AF.

Meanwhile, many of recent cameras are provided with a so-called image shake correction (or image stabilization) function. As a system having such a image shake correction function, there is an optical image shake correction system in which camera shake information is detected by using an angular velocity sensor represented by a vibration gyroscope and the like, and in which a part of the optical system is driven so as to cancel the shake on the basis of the detected shake information. Further, there is also a system in which an image-pickup element is moved in a direction orthogonal to the optical axis so as to cancel the shake, in accordance with the detected shake information. Further, there is also a so-called electronic image shake correction system in which an image hardly having an image shake is obtained by arranging such that a motion vector is detected from an electronic image generated on the basis of an output from an image-pickup element, and that a pickup area of the image is changed on the basis of the vector information.

However, in the case where the external distance measuring AF which is used independently or as a part of the hybrid AF, is performed, when a camera shake occurs, the position of an optical image is shifted on a light receiving sensor (line sensor) for the external distance measuring AF. In particular, when the optical image is shifted to the arrangement direction of light receiving elements which constitute the line sensors, accurate distance measuring information is not obtained, and the focusing accuracy is also deteriorated. Even when the image shake correction function is provided for the image-pickup system, the external distance measuring AF is performed in a system different from the image-pickup system, resulting in such a problem.

BRIEF SUMMARY OF THE INVENTION

One of objects oh the present invention is to provide an image-taking apparatus capable of performing accurate focusing even when a shake occurs.

According to an aspect, the present invention provides an image taking apparatus which comprises an image-pickup element which photoelectrically converts an optical image formed by an image-taking optical system; a controller which performs a first focusing control based on a phase difference of plural optical images formed of luminous fluxes not passing through the image-taking optical system, which plural optical images are detected by a light receiving sensor that photoelectrically converts the plural optical images, and a second focusing control based on an image signal generated by an output from the image-pickup element; and a shake detector which generates information on a shake. The controller preferentially performs one of the first focusing control and the second focusing control in accordance with the information on the shake.

According to another aspect, the present invention provides a focusing method which comprises a step of photoelectrically converting an optical image formed by an image-taking optical system with an image-pickup element, a step of photoelectrically converting plural optical images formed of luminous fluxes not passing through the image-taking optical system with a light receiving sensor, a first control step of performing focusing control on the basis of a phase difference between plural optical images detected by the light receiving sensor, a second control step of performing focusing control on the basis of predetermined frequency components of a video signal generated by an output from the image-pickup element, a shake detection step of generating information on a shake, a step of suppressing the shake of an image generated by the output from the image-pickup element on the basis of the information on the shake, and a step of preferentially performing one of the first control step and the second control step in accordance with the information on the shake.

Other objects and features of the present invention will become readily apparent from the following description of the preferred embodiments with reference to accompanying drawings.

DETAILED DESCRIPTION OF THE PREFERRED EMBODIMENTS

In the following, preferred embodiments of the present invention will be described with reference to the accompanying drawings.

Embodiment 1

Figure 1:
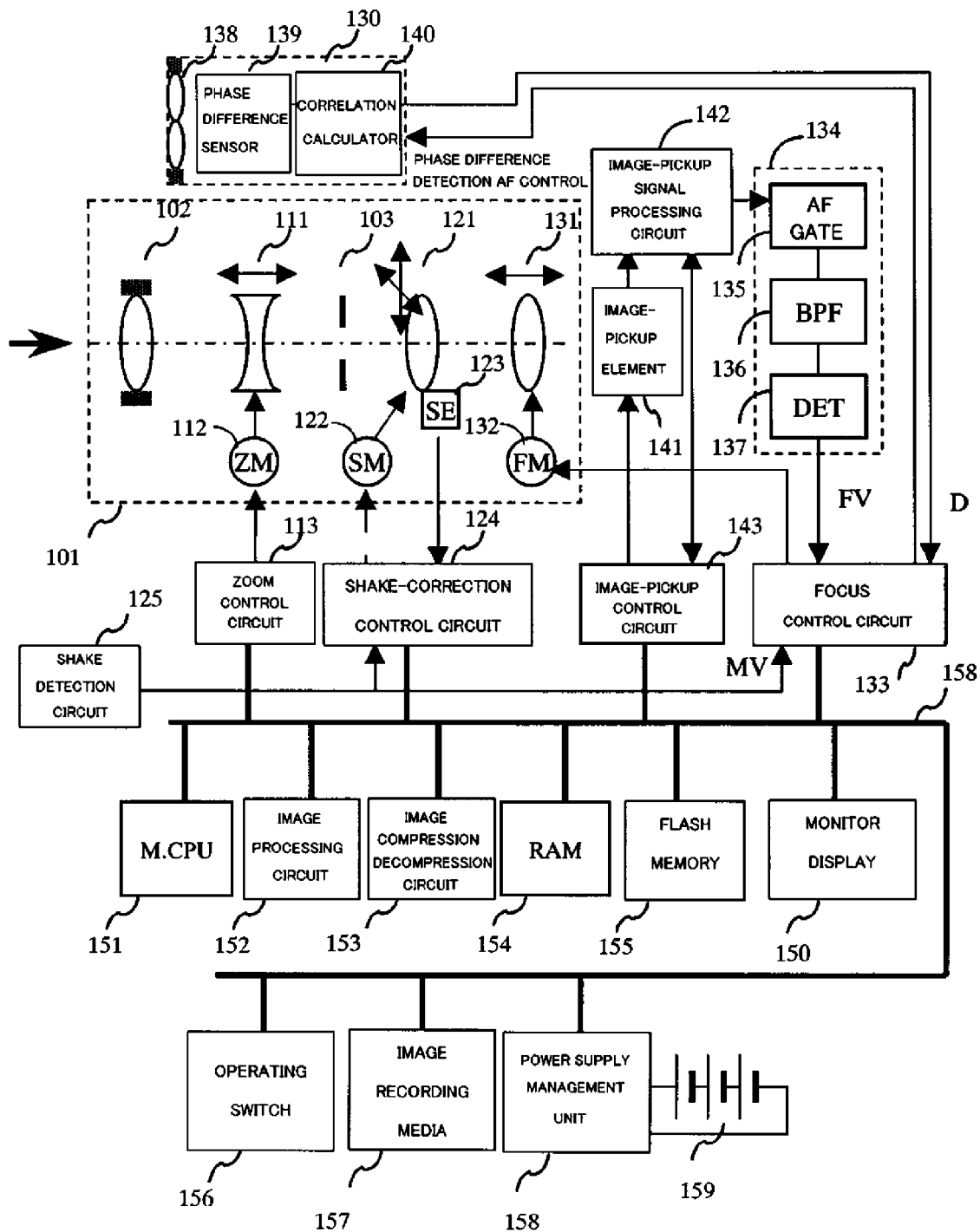
FIG. 1 is a block diagram showing the configuration of a camera which is Embodiment 1 of the present invention.

FIG. 1 shows a constitution of a camera as an image-taking apparatus which is Embodiment 1 of the present invention. Here, the camera represents image-pickup apparatuses, such as video cameras and digital still cameras, which take moving (video) images and still images and record them in image recording media, such as magnetic tapes, magnetic disks, semiconductor memories, and optical disks.

Plural units provided in the camera of the present embodiment are connected with each other via a bus 158, and each unit is controlled by a main CPU 151.

An image-taking lens unit 101 includes a fixed lens 102, variable magnification lens 111, diaphragm unit 103, shake-correcting lens 121, and focus lens 131, in order from the object side. An object image is formed on an image-pickup element 141 by this lens unit 101. The object image is photoelectrically converted by the image-pickup element 141, and thereby image-pickup of the object is performed. This image-pickup operation is controlled by an image-pickup control circuit 143 in accordance with an instruction from the main CPU 151.

A zoom control circuit 113 controls drive of a zoom motor 112 in accordance with an instruction from the main CPU 151, and drives the variable magnification lens 111.

The photoelectrically-converted output from the image-pickup element 141 is converted into an image signal by an image-pickup signal processing circuit 142. Further, the image signal is inputted into an image-pickup signal AF detection circuit 134. In the image-pickup signal AF detection circuit 134, predetermined high frequency components are extracted from apart of the image-pickup signal in a screen by using one or more AF gates 135 and band pass filters (BPF) 136. The extracted high frequency components are subjected to detection processing, such as peak hold and integration, performed by a detector 137. Thereby, an AF evaluation value signal FV is generated and inputted into a focus control circuit 133.

In the case where the plural AF gates 135, BPFs 136, and detectors 137 are provided, plural AF evaluation value signals FV are also generated. Then, in the focus control circuit 133 which constitutes a control device along with the main CPU 151, a signal used in accordance with a predetermined condition is selected from the plural AF evaluation value signals FV, or autofocus control is performed on the basis of the plural AF evaluation value signals FV. The AF evaluation value signal FV is used for the contrast AF (mountain climbing AF).

On the other hand, in an external distance measuring AF module 130, two object images (hereinafter referred to as two images) are formed on a phase difference sensor 139 through a pupil-dividing optical system 138 for external distance measuring AF. The external distance measuring AF module 130 generates a signal (phase difference signal) indicating the phase difference amount of the two images, by a correlation calculator 140 in accordance with than instruction from the focus control circuit 133. Further, the external distance measuring AF module 130 calculates a distance signal D indicating a distance to the object on the basis of the phase difference signal, and inputs the distance signal D into the focus control circuit 133.

The focus control circuit 133 drives the focus lens 131 via a focus motor 132 on the basis of the distance signal D or the AF evaluation value signal FV. Thereby, autofocus (external distance measuring AF or contrast AF) control is performed. Note that performing autofocus control on the basis of the distance signal D is eventually equivalent to performing autofocus control on the basis of the phase difference between the above described two images.

A shake-correction control circuit 124 detects shake information MVY in the yaw direction (horizontal rotation direction) and shake information MVP in the pitch direction (vertical rotation direction) of the camera through a shake detection circuit 125 including an angular velocity sensor such as a vibration gyroscope.

The position of the shake-correcting lens 121 is detected by a position encoder 123. The shake-correction control circuit 124 always detects and monitors the present position of the shake-correcting lens 121 in the yaw direction and the pitch direction. A shake-correction motor 122 is controlled to be driven on the basis of the shake information (MVY, VMP) of the camera, and information of the present position of the shake-correcting lens 121, thereby driving the shake-correcting lens 121 to target positions in the yaw direction and in the pitch direction, and enabling the shake-correcting operation to be performed.

The shake information (MVY, MVP) from the shake detection circuit 125 is also inputted into the focus control circuit 133. When the image shake correcting operation is not performed, or just before the image shake correcting operation is performed, the shake-correcting lens 121 is controlled to be stopped at a predetermined position (position at which the optical axis of the shake-correcting lens 121 substantially coincides with the optical axis of the lens unit 101), on the basis of the present position information from the position encoder 123.

In the present embodiment, a case where the shake-correcting lens 121 is driven to the directions orthogonal to the optical axis, the directions including the yaw direction and the pitch direction, is described. In addition to this, a shake-correcting unit using a variable-angle prism and a shake-correcting unit of a type which rotates a lens around one point on the optical axis as a center in the yaw direction and in the pitch direction may also be used. Further, in the present embodiment, the shake-correcting lens 121 is used as a third lens unit, but the variable-angle prism and the like may also be arranged on the object side from the fixed lens 102.

The image signal arranged in the image-pickup signal processing circuit 142 is temporarily stored in a RAM 154. The image signal stored in the RAM 154 is subjected to compression processing in an image compression/decompression circuit 153 and is recorded in the above-described image recording media 157.

Further, the image signal stored in the RAM 154 is subjected to reduction/magnification processing by an image processing circuit 152, and is displayed on a monitor display 150. Thereby, the taken image is fed back to an image-taking person in real time. Further, immediately after the image-taking, it is also possible to confirm the taken image by making the taken image displayed on the monitor display 150 for a predetermined time period.

Operation switches 156 include a power switch, a zoom switch, a release switch, a moving image recording switch, a monitor display ON/OFF switch, and the like. The power switch is a switch for turning on and off the power supply of the camera. The zoom switch is a switch for instructing the zoom drive. The release switch for picking up a static image has a two-step operation constitution, and hereinafter, the first stroke switch is referred to as SW1, and the second stroke switch is referred to as SW2.

The SW1 is a switch for instructing the return from image-taking standby state and the start of image-taking preparation operations. The image-taking preparation operations include operations of, for example, image shake correction, autofocus and photometry. The SW2 is a switch for instructing the image-taking of a still image and the recording of the taken image in the image recording media 157.

The moving image recording switch is a switch which enables the moving image recording to the image recording media 157 to be started by being pushed in the moving image recording standby state. Further, when the moving image recording switch is pushed in the moving image recording state, the shift to the image recording standby state is effected. The monitor display ON/OFF switch is a switch for switching whether an image is displayed on the monitor display 150 or not.

The power supply management unit 158 performs power supply management by checking the state of power supply from a battery 159 connected to this unit 158, and by charging the battery.

When the camera is started from the state where the power supply is turned off, the program stored in a flash memory 155 is loaded to a part of the RAM 154. The main CPU 151, the zoom control circuit 113, the shake-correction control circuit 124, the image-pickup control circuit 143, and the focus control circuit 133 are operated in accordance with the loaded program.

Figure 2:
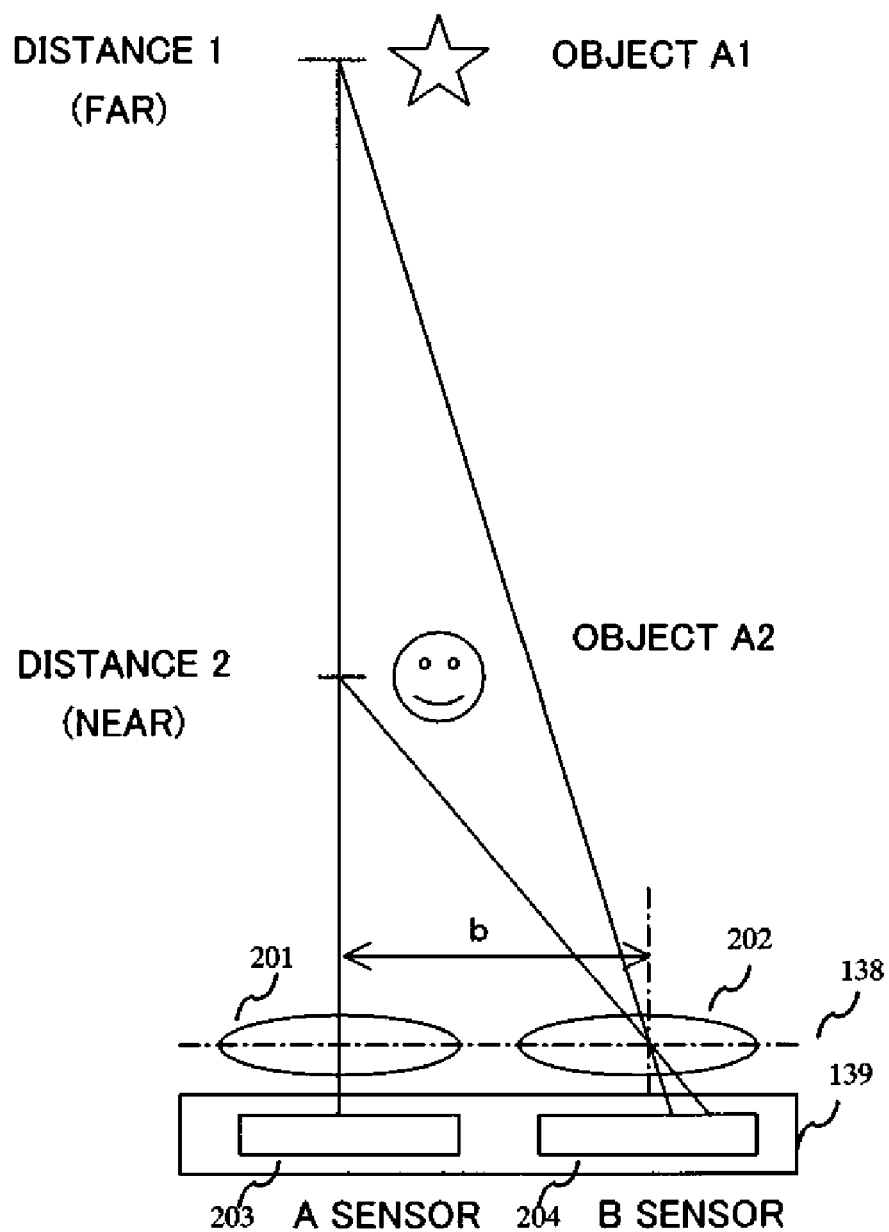
FIG. 2 is a figure explaining an operation principle of an external distance measuring AF module in Embodiment 1.

Next, the operation principle of the external distance measuring AF module 130 according to the present embodiment is explained by using FIG. 2 and FIG. 3. The pupil-dividing optical system 138 comprises a lens 201 for guiding light to an A line sensor 203 which is a light receiving sensor included in the phase difference sensor 139, and a lens 202 for guiding light to a B line sensor 204 which is also a light receiving sensor included in the phase difference sensor 139.

Here, the pupil-dividing optical system 138 is an optical system which is provided independently of the image-taking lens unit 101. That is, on the phase difference sensor 139, optical images formed of luminous fluxes not passing through the image-taking lens unit 101, and more specifically, optical images of luminous fluxes for which the image shake correction by the shake-correcting lens 121 is not effective, are formed.

The lens 201 and the A line sensor 203 are arranged separately from the lens 202 and the B line sensor 204 by a base line length b, as shown in FIG. 2, with respect to an object. The positions of images formed by the A line sensor 203 and the B line sensor 204 are changed in accordance with an object distance.

Figure 3A:
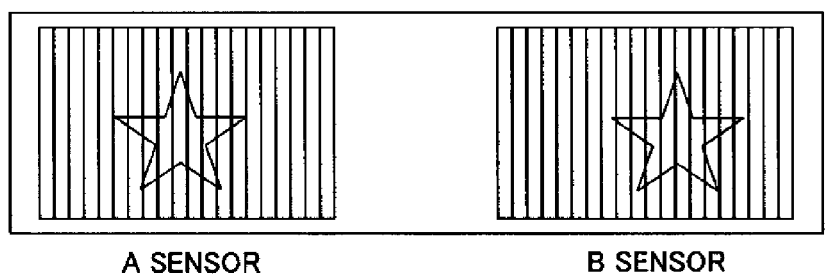
FIG. 3 is a figure showing a situation of object images formed on phase difference sensors in Embodiment 1.
Figure 3B:
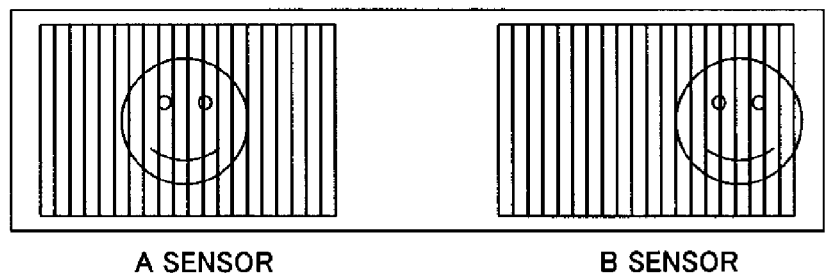

FIG. 3A shows a state where two images of an object A1 that is present at a distance 1 (longer than a distance 2) in FIG. 2 are formed on the A line sensor 203 and the B line sensor 204, respectively. On the other hand, FIG. 3B shows a state where two images of an object A2 that is present at the distance 2 (shorter than the distance 1) in FIG. 2 are formed on the A line sensor 203 and the B line sensor 204, respectively. From these figures, it is seen that when the image forming positions on the A line sensor 203 is taken as a reference, the image forming positions on the B line sensor 204 are deviated between the case of distance 1 and the case of distance 2.

The distance signal D which corresponds to the object distance can be generated in accordance with the principle of triangular distance measuring, by generating a signal representing the deviation amount of the image forming positions, i.e., the phase difference in the correlation calculator 140.

Figure 4A:
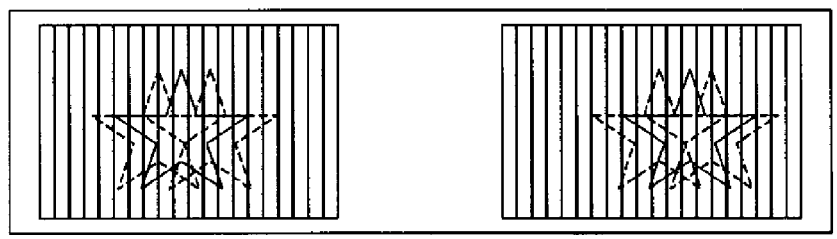
FIG. 4 is a figure showing a situation of the shake of object images formed on the phase difference sensors in Embodiment 1.
Figure 4B:
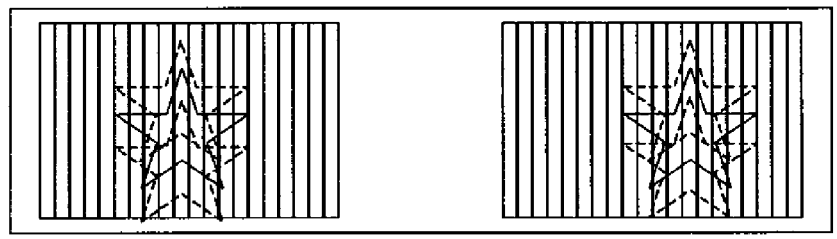

Here, if a shake such as a hand shake is caused in the camera, a shakes is also caused in the object images which are formed on the A line sensor 203 and the B line sensor 204. FIGS. 4A and 4B show the state where the shake is caused. FIG. 4A shows the state where the shake in the yaw direction (horizontal direction) is caused. FIG. 4B shows the state where the shake in the pitch direction (vertical direction) is caused.

In the respective line sensors, plural light receiving elements (pixels) are arranged in the yaw direction. For this reason, when the image shake in the yaw direction is caused within the exposure period, i.e., the charge accumulation time of the phase difference sensor 139, the image is shifted to the other pixels in the respective line sensors. Therefore, the phase difference is changed, so that an erroneous distance signal D may be generated.

On the other hand, each of the pixels is extended long in the pitch direction. For this reason, even when the image shake of a certain extent of size is caused in the pitch direction within the exposure period of the phase difference sensor 139, the phase difference is not changed, and hence, the possibility of generating an erroneous distance signal D is low.

Figure 5:
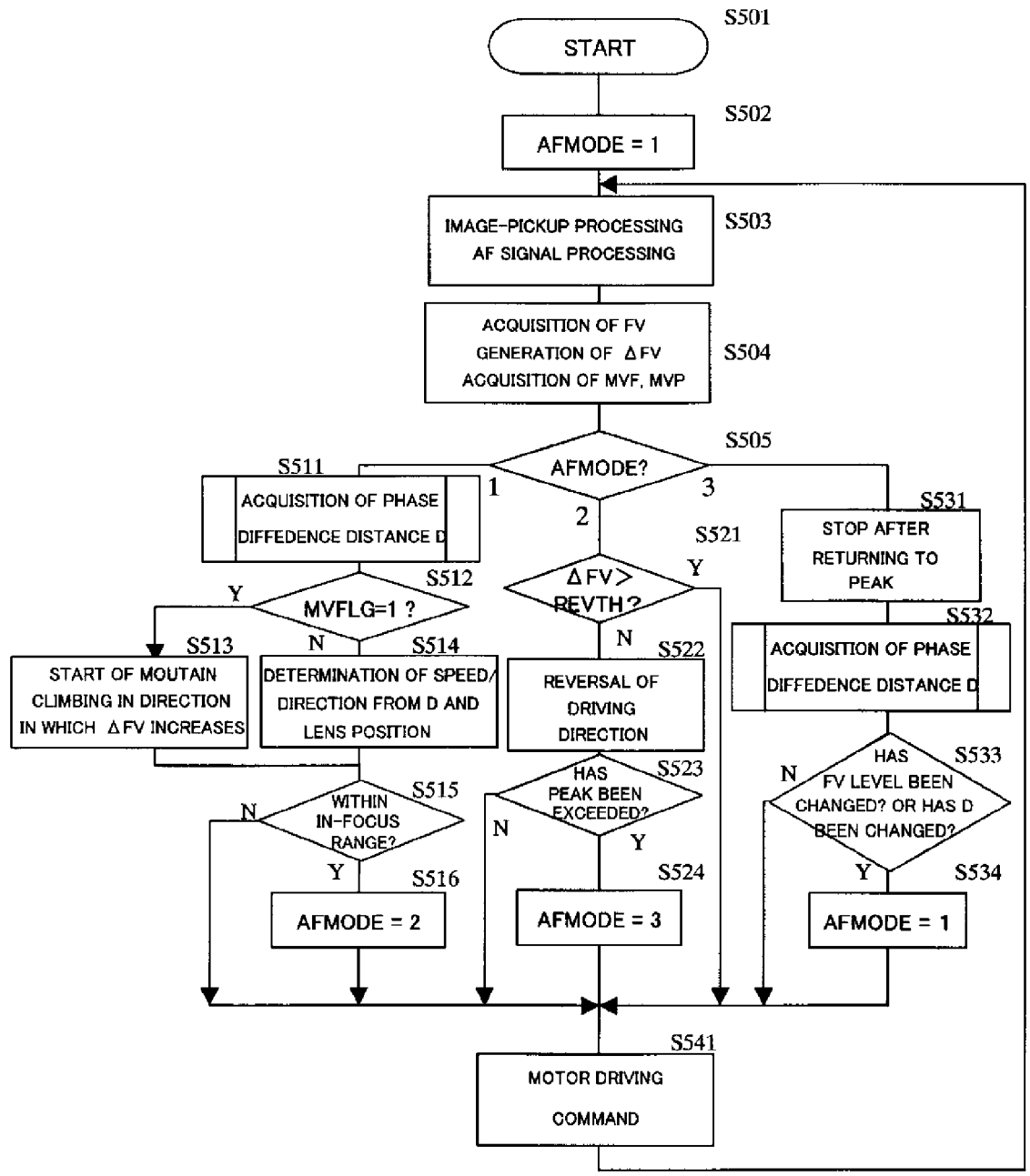
FIG. 5 is a flow chart explaining the operation of the camera in Embodiment 1.

Next, an algorithm of a program executed in the camera according to the present embodiment is explained by using a flow chart shown in FIG. 5. The program is mainly executed by the main CPU 151 and the focus control circuit 133. In the following, a step in the program is denoted as "S".

When the program is started in S501, in S502, the focus control circuit 133 sets an AFMODE flag representing the AF mode to 1.

Next, in S503, the main CPU 151 makes the image-pickup signal processing circuit 142 perform image-pickup signal processing, and also makes the AF signal processing circuit 134 perform AF signal processing.

Next, in S504, the focus control circuit 133 acquires an AF evaluation value signal FV (hereinafter referred to as FV signal) from the AF signal processing circuit 134, and generates a ΔFV signal which represents a difference between the FV signal and the FV signal acquired just before. Although not described in the flow chart, each time the FV signal is acquired, the FV signal is updated and stored in a memory (not shown), and is used for calculating the difference between the newly acquired FV signal and the FV signal acquired just before.

Further, in S504, the shake information MVY in the yaw direction (horizontal direction) of the camera and the shake information MVP in the pitch direction (vertical direction) of the camera are acquired from the shake detection circuit 125.

Next, in S505, the process proceeds to one of S511, S521 and S531 in accordance with the AFMODE flag. In the first routine, the AFMODE flag is set to 1 (S502), and hence, the process proceeds to S511.

In S511, the distance signal D is acquired from the external distance measuring AF module 130 in accordance with a subroutine as will be described below.

In S512, whether or not a MV flag (hereinafter described as MVFLG) is set in the subroutine in S511 is determined. When the MV flag is set (MVFLG=1), the process proceeds to S513, and when the MV flag is not set (MVFLG=0), the process proceeds to S514. The MVFLG is a flag which represents the existence of a medium shake. When there is a medium shake, the MVFLG is set to MVFLG=1, and when there is a shake smaller than the medium shake, the MVFLG is set to MVFLG=0.

In S513, in accordance with ΔFV signal obtained from the image-pickup signal, the lens driving direction and the lens driving speed for starting the so-called mountain climbing AF operation in the direction to increase ΔFV are determined. The reason for performing the mountain climbing AF operation when the medium shake exists, is that a shake of an object image formed on the image-pickup element 141 is suppressed by the image shake correction effect of the shake-correcting lens 121, so as to be suitable for performing the contrast AF.

On the other hand, in S514, on the basis of a relationship between the distance signal D and the present position of the focus lens 131, the driving direction and speed of the focus lens 131 (that is, the driving direction and speed of the focus motor 132) are determined so as to allow the focus lens 131 to approach an in-focus position. That is, the driving direction is set to the direction to allow the focus lens 131 to approach the focus lens position corresponding to the distance signal D. Further, when the distance from the present position of the focus lens 131 to the focus lens position corresponding to the distance signal D is large, the driving speed is set to a high speed, and when the distance is small, the drive speed is set to a low speed. When the present position of the focus lens 131 with respect to the focus lens position corresponding to the distance signal D is included in a predetermined in-focus range, the determination to stop the focus lens 131 is made.

In S515, whether or not the present position of the focus lens 131 is within a predetermined in-focus range is determined. When the present position of the focus lens 131 is within the predetermined in-focus range, the process proceeds to S516. In S516, the AFMODE flag is set to 2, and the process proceeds to S541.

In S541, the focus lens 131 is driven in the determined direction at the determined drive speed, and the process proceeds to S503. Thereafter, the processing from S503 is repeated synchronously with the period for reading out the accumulated charge from the image-pickup element 141 (image-pickup signal processing period).

On the other hand, it is judged that when the present position of the focus lens 131 is not within the predetermined in-focus range, the process directly proceeds to S541.

Next, in S505, when the AFMODE flag is set to 2, the process proceeds to S521. In S521, whether the FV signal acquired in S504 is increased or decreased is judged by using the ΔFV signal. In S521, in the case where the FV signal is decreased, and where the ΔFV signal is larger than a predetermined reverse rotation threshold value (ΔFV>REVTH), the process proceeds to S541. When the ΔFV signal is equal to or less than the predetermined reverse rotation threshold value (ΔFV≦REVTH), the process proceeds to S522.

In S522, the driving direction of the focus lens 131 is reversed. Then, in S523, whether or not the decrease in the FV signal is a decrease after passage of the peak of the FV signal is determined. When it is judged that the decrease is caused before passage of the peak of the FV signal in S523, the process proceeds to S541. When it is judged that the decrease is caused after passage of the peak of the FV signal in S523, the process proceeds to S524. In S524, the AFMODE flag is set to 3.

When the AFMODE flag is set to 3 in S505, the process proceeds to S531. In S531, the focus lens 131 is returned to the position at which the FV signal shows a peak, and is stopped. This position of the focus lens is the in-focus position.

In S532, the distance signal D is acquired from the external distance measuring AF module 130 in accordance with a subroutine as will be described below. Next, in S533, whether or not the FV signal is decreased from a predetermined level including the peak value is monitored, and at the same time, whether or not the distance signal D is changed from the distance signal corresponding to the present position of the focus lens 131 is also monitored. When there is no change in the FV signal and the distance signal D, the process proceeds to S541. When there are changes in the FV signal and the distance signal D, the AFMODE flag is set to 1 in S534, and the process proceeds to S541. The AF processing is restarted by returning to S503 from S541.

Figure 6:
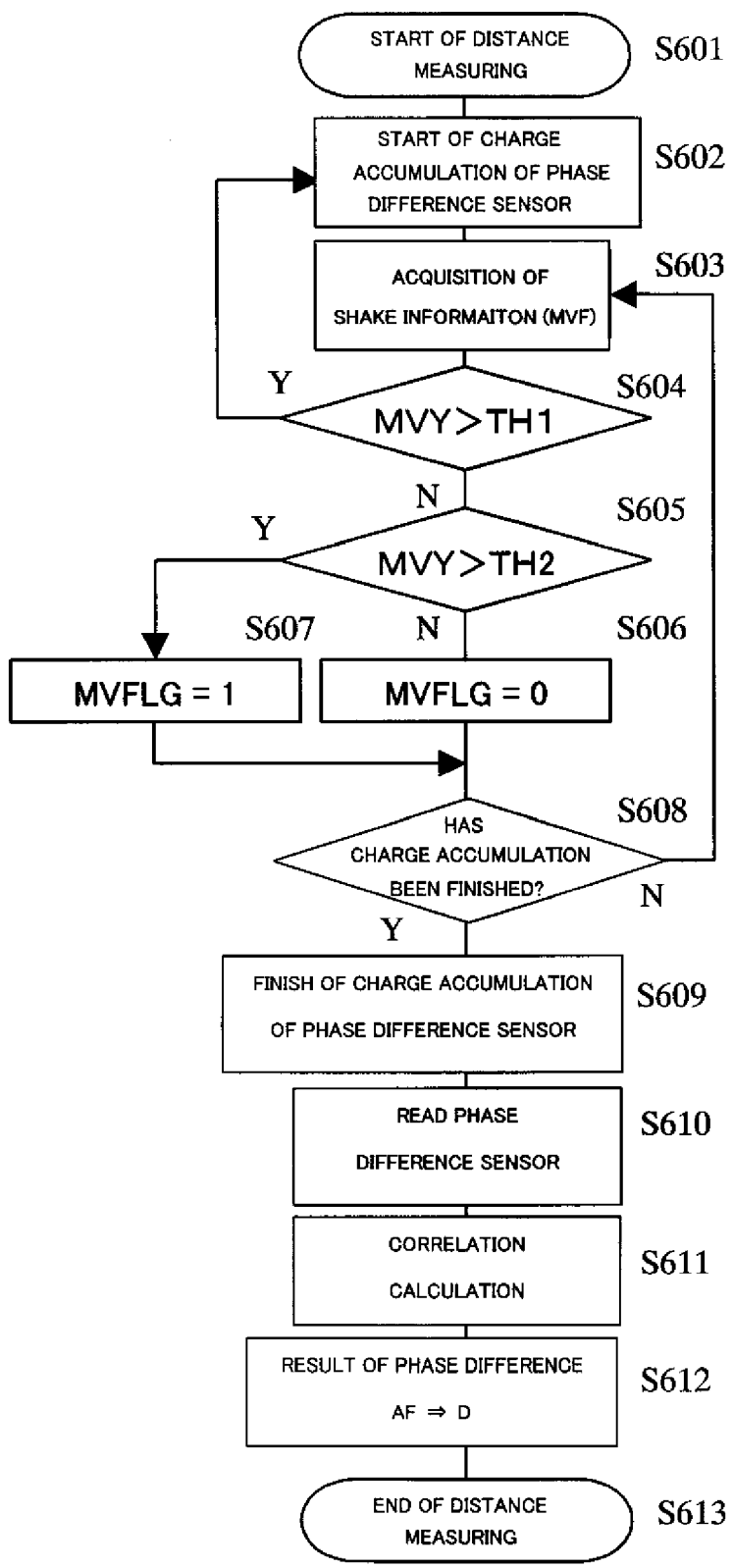
FIG. 6 is a flow chart explaining the operation of the camera in Embodiment 1.

Next, the phase-difference distance measuring subroutine performed in S511 and S532 in FIG. 5 will be explained by using a flow chart shown in FIG. 6.

When a distance measuring start instruction is inputted from the main CPU 151 in S601, the focus control circuit 133 enables the phase difference sensor (that is, each line sensor) 139 to start a charge accumulation operation (exposure) in S602.

Next, in S603, the shake information MVY in the yaw direction is acquired from the shake detection circuit 125. Then, in S604, whether or not the shake information MVY in the yaw direction is larger than a predetermined threshold value TH1 (a first predetermined value) is determined. The reason for determining the magnitude of the shake by using the shake information MVY in the yaw direction, is that the phase difference between the two images is changed in accordance with the magnitude of the shake in the yaw direction, as described above.

When the shake information MVY is larger than the threshold value TH1, that is, when a shake larger than the medium shake is caused, the process returns to S602. Thereby, before the charge accumulation operation of the phase difference sensor 139 is finished, the charge accumulation operation is started again. That is, the charge accumulation operation is performed again from the beginning, without waiting the end of the charge accumulation operation of the phase difference sensor 139.

When the shake information MVY is equal to or less than the threshold value TH1 in S604, the process returns to S605. In S605, whether or not the shake information MVY is larger than a threshold value TH2 (a second predetermined value) which is set smaller than the threshold value TH1 is determined, that is, whether or not the shake information MVY is smaller than the threshold value TH1 and is larger than the threshold value TH2 is determined.

When it is determined that the shake information MVY is larger than the threshold value TH2, that is, the medium shake is caused, the process proceeds to S607, and the MVFLG is set to 1. Thereafter, when the process returns to the flow chart shown in FIG. 5, the mountain climbing AF is performed on the basis of the FV signal.

On the other hand, when it is determined that the shake information MVY is equal to or smaller than the threshold value TH2, that is, when a small shake is caused, the process proceeds to S606 and the MVFLG is set to 0. Thereafter, when the process returns to the flowchart shown in FIG. 5, the external distance measuring AF is performed. That is, which of the mountain climbing AF and the external distance measuring AF is preferentially performed is determined in accordance with the shake information MVY.

Next, in S607, whether or not the charge accumulation is finished is determined by using the determination on whether or not the charge level of specified pixels of the line sensors has reached a predetermined level, and the discrimination on whether or not a predetermined period of time has elapsed after the start of charge accumulation. The reason for performing the determination on whether or not the charge level of the specified pixels has reached a predetermined level is that the charge level is different depending upon the state of the object and the image-taking conditions. Further, the reason for performing the determination on whether or not the charge accumulation time period has reached a predetermined period is that the AF processing is delayed, when waiting for the charge level to reach a predetermined level in the case of a dark object.

When the charge accumulation is finished, the process proceeds to S609. When the charge accumulation is not finished, the process returns to S603, and the processes from S603 to S608 are repeated until the charge accumulation is finished.

In S609, the charge accumulation operation of the phase difference sensor 139 is finished, and the accumulated charge is read out from the phase difference sensor 139 in S610. Then, in S611, on the basis of the read charge data, the correlation calculation between the output of A line sensor 203 and the output of B line sensor 204 is performed to obtain a phase difference, and further, the distance signal D is obtained from the phase difference.

Next, in S612, the calculation result in S611 is stored in a memory (not shown) as data of the distance signal D, and the distance measuring operation is finished in S613.

Note that a case where the camera shake is detected by using the shake information from the angular velocity sensor is explained in the present embodiment, but as in the case of Embodiment 3 as will be described below, information on a motion vector obtained from an electronic image (image signal) generated by using the image-pickup element may also be used as information on the shake.

Embodiment 2

In a camera which is Embodiment 2 of the present invention, the method for obtaining the result of distance measuring from the phase difference sensor 139 is different from that in Embodiment 1. In the present embodiment, the configuration and the basic procedures are the same as those shown in FIG. 1 and in the flow chart in FIG. 5 in conjunction with Embodiment 1, but the method for acquiring the distance signal D in S511 and S532 in FIG. 5 is different from the method in Embodiment 1.

Figure 7:
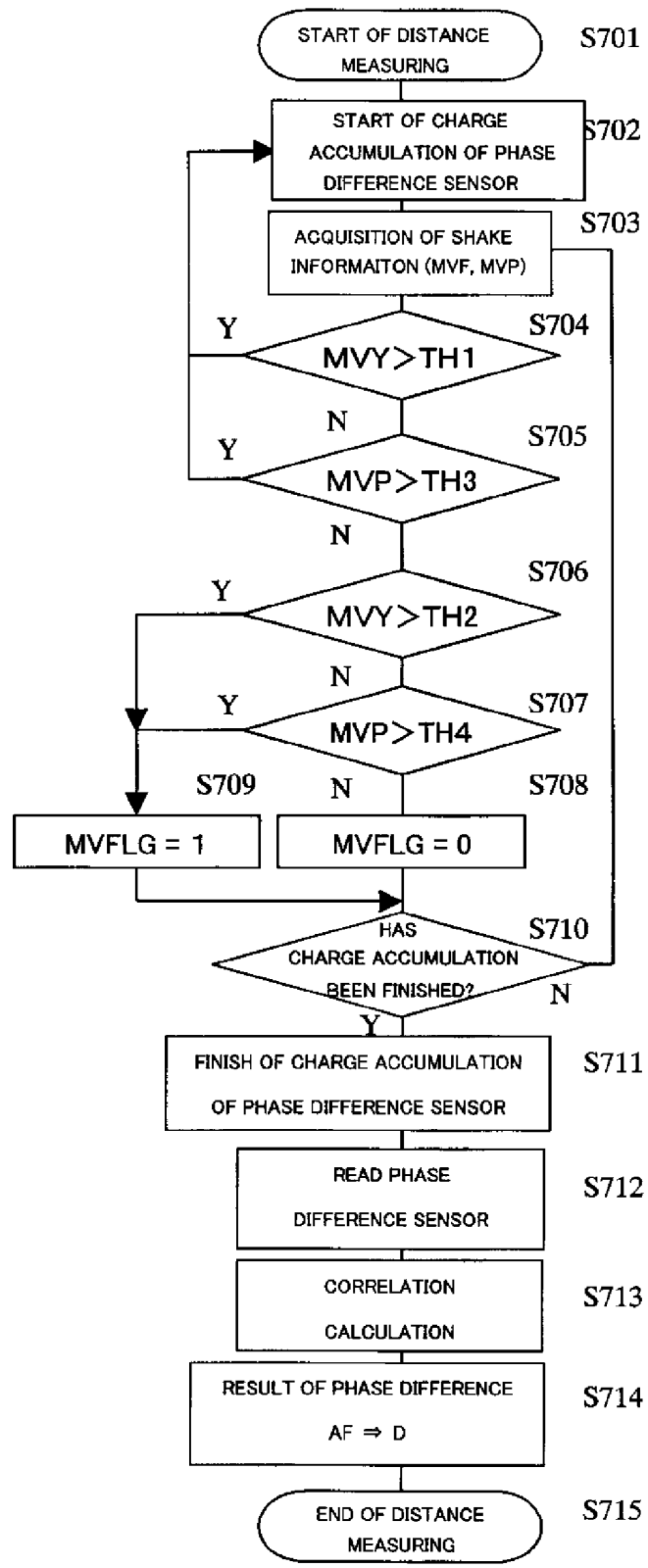
FIG. 7 is a flow chart explaining an operation of a camera which is Embodiment 2 of the present invention.

FIG. 7 shows an algorithm of a program (phase-difference distance measuring subroutine) executed in S511 and S532 in FIG. 5, in the camera according to the present embodiment. Note that components which are common to the components shown in FIG. 1 according to Embodiment 1, are denoted by the same reference numerals.

When a distance measuring start instruction is inputted from the main CPU 151 in S701, the focus control circuit 133 enables the phase difference sensor (that is, each line sensor) 139 to start the charge accumulation operation (exposure) in S702.

Next, in S703, the shake information MVY in the yaw direction and the shake information MVP in the pitch direction are acquired from the shake detection circuit 125. Then, in S704, whether or not the shake information MVY in the yaw direction is larger than the predetermined threshold value TH1 (a first predetermined value in the yaw direction) is determined. When the shake information MVY is larger than the threshold value TH1, that is, when a shake larger than the medium shake is caused in the yaw direction, the process returns to S702. Thereby, before the current charge accumulation operation of the phase difference sensor 139 is finished, the charge accumulation operation is started again. That is, the charge accumulation operation is performed again from the beginning, without waiting the end of the current charge accumulation operation of the phase difference sensor 139.

When the shake information MVY is equal to or less than the threshold value TH1 in S704, the process proceeds to S705. Then, whether or not the shake information MVP in the pitch direction is larger than a threshold value TH3 (a first predetermined value in the pitch direction) is determined. Here, the phase difference sensor 139 has a fine pixel pitch in the yaw direction and is liable to be influenced by the image shake in the yaw direction. For this reason, the threshold value TH1 in the yaw direction is set smaller than the threshold value TH3 in the pitch direction.

When the shake information MVP in the pitch direction is equal to or less than the threshold value TH3, the process proceeds to S706. Then, whether or not the shake information MVY in the yaw direction is larger than threshold value TH2 (a second predetermined value in the yaw direction) which is set smaller than the threshold value TH1, is determined. When the shake information MVY in the yaw direction is larger than the threshold value TH2 (is smaller than the threshold value TH1, and larger than the threshold value TH2), it is judged that a medium shake is caused, so that the process proceeds to S709 and the MVFLG is set to 1. Thereafter, when the process returns to the flowchart shown in FIG. 5, the mountain climbing AF based on the FV signal is performed.

On the other hand, when it is determined that the shake information MVY in the yaw direction is equal to or less than the threshold value TH2, and that a small shake is caused, the process proceeds to S707. Then, whether or not the shake information MVP in the pitch direction is larger than a threshold value TH4 (a second predetermined value in the pitch direction) which is set smaller than the threshold value TH3, is determined. Here, the threshold values TH2 and TH4 are set such that the ratio between the threshold values TH2 and TH4 is the same as the ratio of the pixel pitch of the image-pickup element 141 in the horizontal direction to that in the vertical direction.

When it is determined that the shake information MVP in the pitch direction is equal to or less than the threshold value TH4, that is, a small shake is caused, the process proceeds to S708 and the MVFLG is set to 0. Thereafter, when the process returns to the flow chart shown in FIG. 5, the external distance measuring AF is performed. That is, which of the mountain climbing AF and the external distance measuring AF is preferentially performed is determined in accordance with the shake information MVY and MVP.

Next, in S710, whether or not the charge accumulation is completed is determined by using the determination on whether or not the charge level of specified pixels of the line sensors has reached a predetermined level, and the determination on whether or not a predetermined period of time has elapsed from the start of charge accumulation. When the charge accumulation is completed, the process proceeds to S711. When the charge accumulation is not completed, the process returns to S703, and the processes S703 to S710 are repeated until the charge accumulation is completed.

In S711, the charge accumulation operation of the phase difference sensor 139 is finished, and the stored electric charge is read out from the phase difference sensor 139 in S712. Then, in S713, on the basis of the read electric charge data, a phase difference is obtained by performing the correlation calculation between the output of A line sensor 203 and the out put of B line sensor 204, and further, the distance signal D is obtained from the phase difference.

Next, in S714, the operation result obtained in S713 is stored in a memory (not shown) as data of the distance signal D, and the distance measuring is finished in S715.

Embodiment 3

In Embodiment 3 according to the present invention, a case where a motion vector of an electronic image acquired by the image-pickup element 141 is used for detecting a shake, instead of using an angular velocity sensor, such as a vibration gyroscope, is explained. The information of motion vector is also included in "the information on the shake", similarly to the shake information obtained by the angular velocity sensor.

Figure 8:
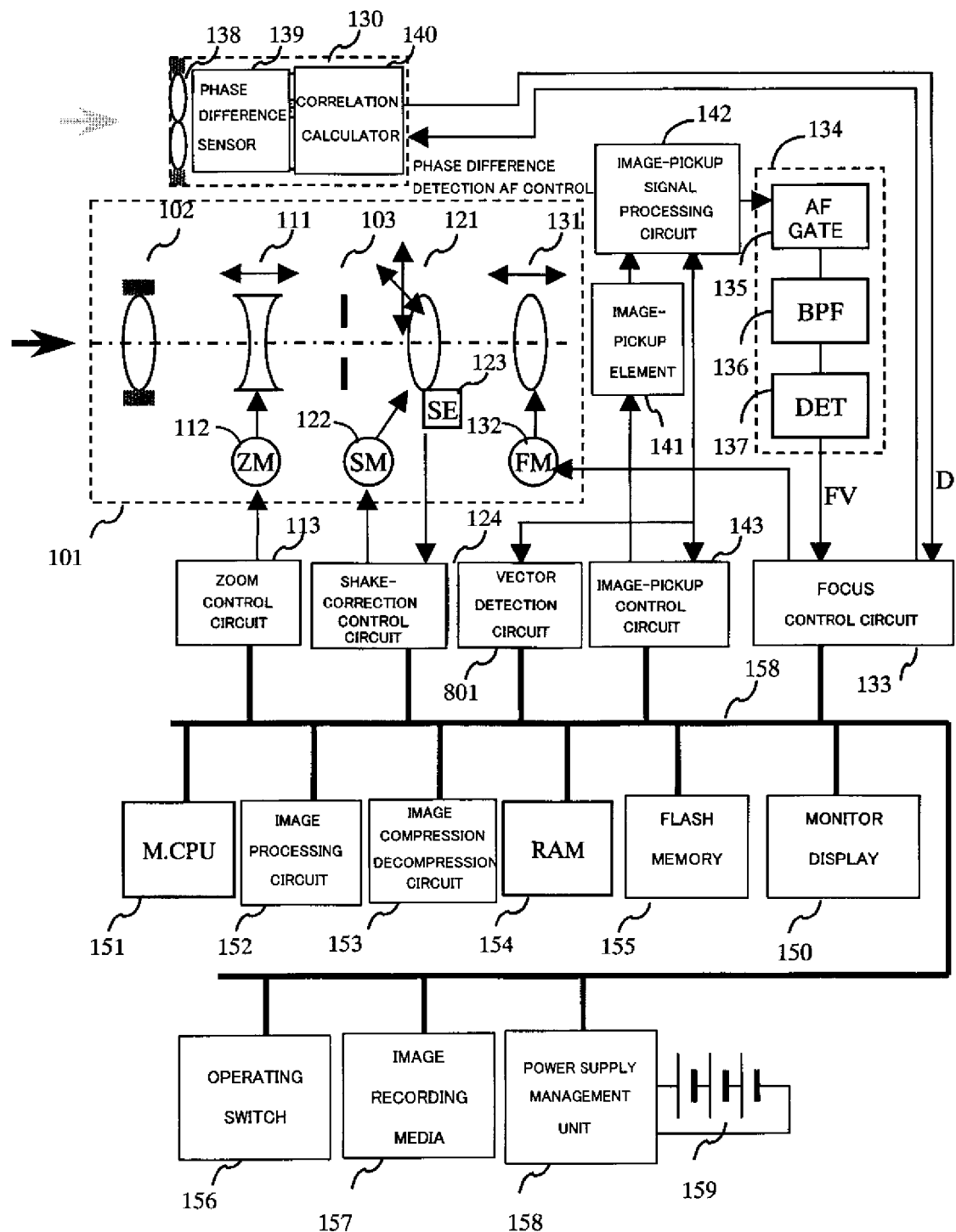
FIG. 8 is a block diagram showing the configuration of a camera which is Embodiment 3 of the present invention.

FIG. 8 shows a configuration which is a camera according to Embodiment 3. Note that in FIG. 8, components which are common to those shown in FIG. 1 according to Embodiment 1, are denoted by the same reference numerals.

In FIG. 8, 801 denotes a vector detection circuit which detects a motion vector from an image signal (video signal) obtained from the image-pickup signal processing circuit 142. Specifically, a feature point of each block in one field (frame) image that is a just preceding image stored in a memory (not shown), and a feature point of each corresponding block in one field image obtained at this time, are respectively extracted, so as to detect the displacement between the feature points. Thereby, the motion vector for each block is detected.

Figure 9:
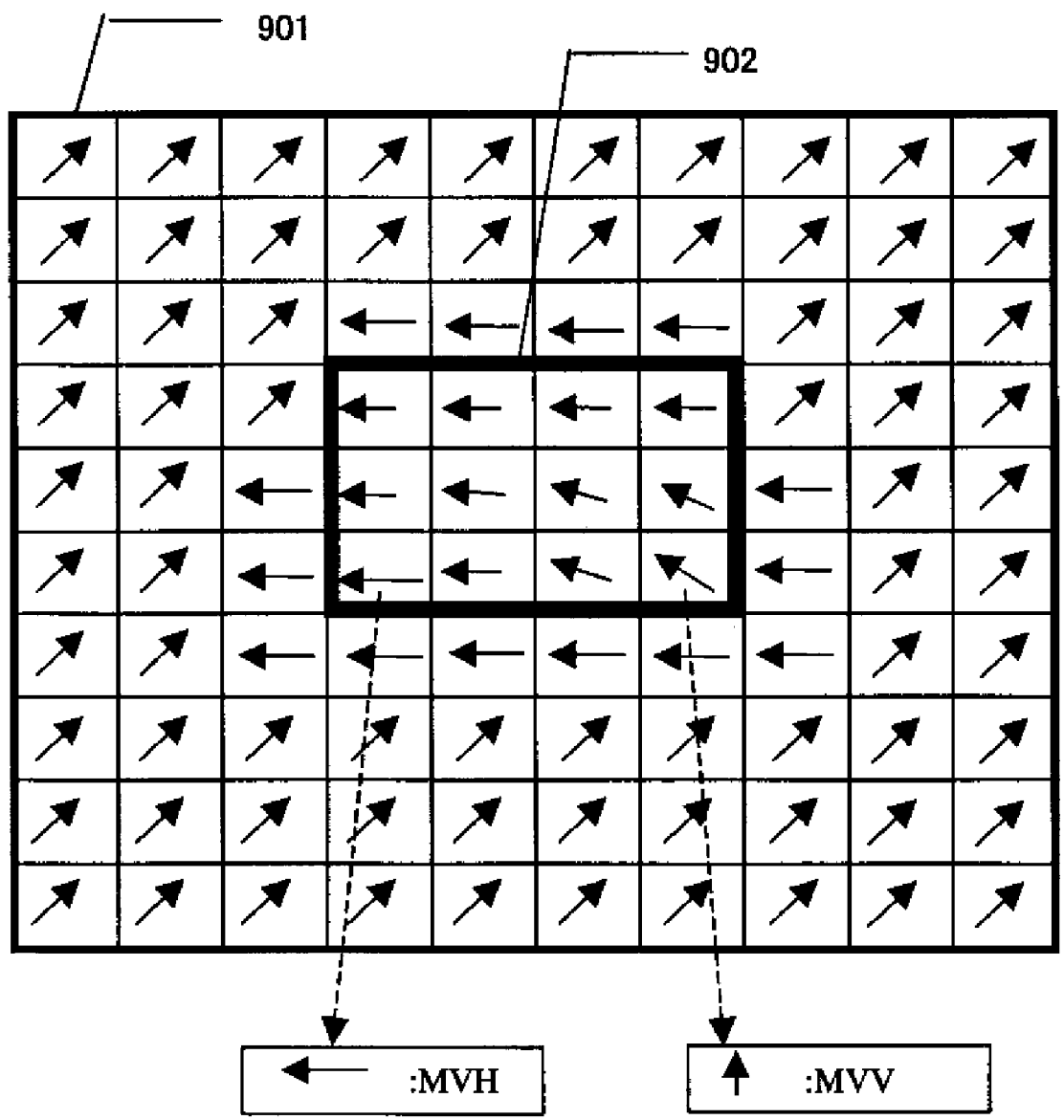
FIG. 9 is a figure explaining motion vector detection in the camera in Embodiment 3.

FIG. 9 shows an example of the motion vector detection for each block. Here, the screen (image-taking range) 901 of one field image is divided into small blocks of 10×10, and an average motion vector for each block is detected. The region in the thick frame at the screen center represents a block corresponding to the detection field of the phase difference sensor 139.

Here, in the conventional motion vector detection for image shake correction, there are many cases where a main object such as a person exists at the screen center, and where the person moves. Thus, the motion vector detection is generally performed in a screen peripheral region in which the stationary background exists. On the other hand, in the present embodiment, the motion vector is detected in the region corresponding to the detection field of the phase difference sensor 139. This makes it possible to detect a fluctuation of the phase difference due to a change in the image forming position on the phase difference sensor 139, which is caused by the camera shake, and a fluctuation of the phase difference due to a change in the image forming position, which is caused by the movement of the main object.

In a region 902 corresponding to the detection field of the phase difference sensor 139, shown in FIG. 9, an average maximum motion vector in the yaw direction (horizontal direction) is the MVH, and the average maximum motion vector in the pitch direction (vertical direction) is the MVV. The motion vector MVH in the yaw direction is used instead of the shake information MVY explained in Embodiments 1 and 2, and the motion vector MVV in the pitch direction is used instead of the shake information MVP explained in Embodiment 2. Thereby, as described above, it is possible not only to prevent the camera shake, but also to prevent the generation of an erroneous distance signal D due to the fluctuation of phase difference, even for an object which moves.

Note that the flow chart of focus control in the camera according to the present embodiment is the same as those in Embodiment 1 (FIG. 5 and FIG. 6) and in Embodiment 2 (FIG. 7), except that the above described motion vectors MVH and MVV are used.

As described above, according to each of the above-described embodiments, even in the case where the camera shake is caused and where the object moves, it is possible to perform accurate phase-difference detection, by controlling the charge accumulation operation of the phase difference sensor in accordance with the information on the shake (shake information or motion vector information). Therefore, it is possible to realize a hybrid AF which is highly resistant to the camera shake and the movement of the object.

Further, either of the external distance measuring AF and the contrast AF is preferentially performed in accordance with the information on the shake, so that it is possible to realize a hybrid AF which is capable of performing optimal focusing control in accordance with the shake.

In other words, according to the first optical apparatus and the first focusing method of the present invention, by controlling the operation of the light receiving sensor in accordance with the information on the shake, it is possible to perform accurate phase-difference detection, even when the shake is caused in the optical apparatus. This makes it possible to perform highly accurate focusing control.

Further, according to the second optical apparatus and the second focusing method of the present invention, even when displacement of an optical image on the light receiving sensor is caused due to the movement of the object, in addition to the shake of the optical apparatus, it is possible to perform accurate phase-difference detection, and to thereby perform highly accurate focusing control.

Further, according to the second optical apparatus and the second focusing method of the present invention, by preferentially performing either of the focusing control based on the phase difference or the focusing control based on the predetermined frequency components of a video signal, in accordance with the information on the shake, it is possible to perform optimal focusing control in accordance with the shake of the optical apparatus.

Note that in each of the above described embodiments, cases where the image shake is corrected by a so-called optical image shake correction mechanism, are explained, but the shake prevention method according to the present invention is not limited to these. For example, an electronic image shake correction processing for suppressing the image shake in an output image (electronic image) may also be performed by shifting a pickup range in each field image acquired by the image-pickup element, on the basis of the results of shake detection. Further, as a kind of the electronic image shake correction processing, the image shake may also be suppressed by shifting the image-pickup element in the yaw direction and in the pitch direction on the basis of the results of shake detection. That is, if the image shake in an eventually outputted electronic image can be suppressed, either of the optical method and the electronic method may be used as the image shake correction method according to the present invention.

Furthermore, the present invention is not limited to these preferred embodiments and various variations and modifications may be made without departing from the scope of the present invention.

This application claims foreign priority benefits based on Japanese Patent Application No. 2005-271423, filed on Sep. 20, 2005, which is hereby incorporated by reference herein in its entirety as if fully set forth herein.

What is claimed is:

1. An image taking apparatus comprising:
an image-pickup element which photoelectrically converts an optical image formed by an image-taking optical system;
a controller which performs a first focusing control based on a signal detected by a light receiving sensor that photoelectrically converts an optical image formed of a luminous flux not passing through the image-taking optical system, and a second focusing control based on an image signal generated by an output from the image-pickup element; and
a shake detector which generates information on a shake,
wherein the controller preferentially performs one of the first focusing control and the second focusing control in accordance with the information on the shake.

2. The image taking apparatus according to claim 1,
wherein when the shake is smaller than a predetermined value, the first focusing control is preferentially performed, and
wherein when the shake is larger than the predetermined value, the second focusing control is preferentially performed.

3. The image taking apparatus according to claim 1,
wherein the controller controls an operation of the light receiving sensor in accordance with the information on the shake.

4. The image taking apparatus according to claim 3,
wherein when the shake is larger than a first predetermined value during a charge accumulation operation of the light receiving sensor, the controller causes the light receiving sensor to perform the charge accumulation operation again, wherein when the shake is smaller than a second predetermined value that is set smaller than the first predetermined value, the controller preferentially performs the first focusing control, and
wherein when the shake is smaller than the first predetermined value and larger than the second predetermined value, preferentially performs the second focusing control.

5. The image taking apparatus according to claim 1,
wherein when the shake is larger than a first predetermined value during the charge accumulation operation of the light receiving sensor, the controller causes the light receiving sensor to perform the charge accumulation operation again without waiting for the end of the current charge accumulation operation.

6. The image taking apparatus according to claim 1,
wherein the light receiving sensor has plural light receiving elements arranged in a first direction, and
wherein when the shake in the first direction is larger than a first predetermined value, the controller causes the light receiving sensor to perform the charge accumulation operation again.

7. The image taking apparatus according to claim 1,
wherein the shake detector generates shake information by using an angular velocity sensor.

8. The image taking apparatus according to claim 1,
wherein the shake detector generates motion vector information from an electronic image generated by die output from the image-pickup element.

9. The image taking apparatus according to claim 1, further comprising a shake-correcting unit which suppresses a shake of an image generated by the output from the image-pickup element.

10. The image taking apparatus according to claim 9, wherein the shake-correcting unit suppresses the shake of the image by controlling the image-taking optical system.

11. The image taking apparatus according to claim 9, wherein the shake-correcting unit suppresses the shake of the image by processing the image signal generated by the output from the image-pickup element.

12. A focusing method comprising:
a step of photoelectrically converting an optical image formed by an image-taking optical system with an image-pickup element;
a step of photoelectrically converting an optical image formed of a luminous flux not passing through the image-taking optical system with a light receiving sensor;
a first control step of performing focusing control on the basis of a signal detected by the light receiving sensor;
a second control step of performing focusing control on the basis of predetermined frequency components of a video signal generated by an output from the image-pickup element;
a shake detection step of generating information on a shake;
a step of suppressing the shake of an image generated by the output from the image-pickup element on the basis of the information on the shake; and
a step of preferentially performing one of the first control step and the second control step in accordance with the information on the shake.

* * * * *